Feb. 22, 1955 V. IVANOFF ET AL 2,702,730
BEARING
Filed Feb. 12, 1952
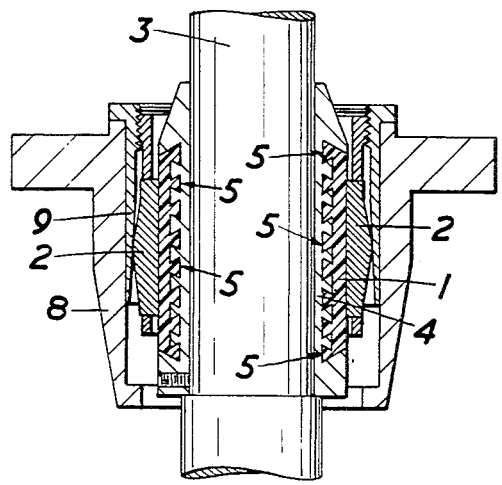
FIG. 1.
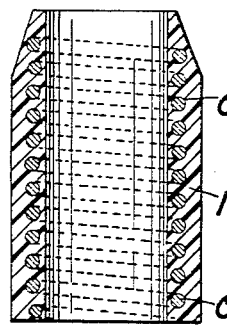 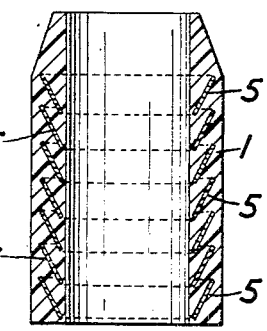 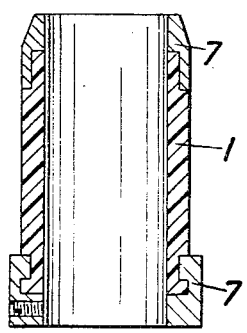
FIG. 2.   FIG. 3.   FIG. 4.
Inventors
Victor Ivanoff
Ralph E. King
By Cobb Cobb
Attorneys

# United States Patent Office 2,702,730
Patented Feb. 22, 1955

2,702,730

BEARING

Victor Ivanoff and Ralph Edward King, Luton, England, assignors to Hayward Tyler and Company Limited, Luton, England, a British company Application February 12, 1952, Serial No. 271,147

12 Claims. (Cl. 308—73)

This invention relates to bearings and has particular reference to bearings of the tilting pad type. The invention has for its object the provision of improvements in such bearings. The invention consists broadly of a bearing of the tilting-pad type wherein the bearing surface which engages the tilting pads is composed of synthetic resin material.

In order that the invention may be the more clearly understood a number of embodiments thereof will now be described, reference being made to the accompanying drawings wherein:

Figure 1 is a sectional elevation of a tilting pad bearing in accordance with the invention, Figures 2, 3 and 4 are sectional elevations illustrating alternative forms which the inner bearing element may assume.

Referring to the drawings the inner elment 1 of the bearing, which runs in the tilting metal pads 2, is composed of plastic material say of the phenol formaldehyde type. This functions particularly well when water is the lubricant employed for the bearing. This plastic material takes the form of a sleeve mounted fast on a rotating metal shaft 3, but as said plastic material absorbs liquid to a certain extent it would undergo a certain amount of swelling if means are not provided to prevent it, and this would be liable to cause the sleeve 1 to become loose on the shaft 3. Also the swelling if freely permitted would involve providing a greater clearance between the sleeve 1 and the pads 2 than would otherwise be necessary.

To avoid these difficulties the plastic material 1 is prevented from substantial swelling. In the case of Figure 1 this is effected by its being keyed to a metal sleeve 4 which is mounted fast on the shaft 3. Said material 1 is moulded round said sleeve 4 which has cut in its outer periphery a series of circular grooves 5 (or a spiral groove) which may be under-cut as shown. Alternatively the material may be moulded direct on the shaft 3 and a number of metal rings 5 (Figure 3) or a metal spiral coil 6 (Figure 2) may be embedded in the thickness of the plastic sleeve. In the case of the metal rings 5 these may be of conical form and relatively thin in the radial direction and may overlap each other longitudinally to a certain extent as shown, but there should always be sufficient clearance between the rings to ensure that the one piece continuity of the sleeve 1 is maintained and that sufficient strength is accordingdy ensured.

Again, as shown in Figure 4, a substantial metal ring 7 could be shrunk over one or both ends of the plastic sleeve 1, thereby ensuring that that end will not fail to maintain an interference fit with the shaft, and that the sleeve will therefore not come loose on the shaft.

In the particular arrangement shown, the bearing is of the kind in which the housing 8 of the bearing has its inner periphery lined with a bush 9 which inner periphery is slightly coned, and the pivot points of the tilting pads 2 engage this coned inner periphery. The tilting pads 2 are located by means of a cage 10 which makes screw engagement 11 at one end within the bush 9. By rotatably adjusting the cage 10 within the bush 9, said cage, and therefore the pads 2 are adjusted longitudinally and thereby the tightness of the pads 2 on the sleeve 1 is adjusted.

The invention is particularly useful in connection with the pump and motor combination described in the copending U. S. patent application Serial No. 271,148, filed of even date herewith. As described in that application the common shaft of a pump and motor runs in two bearings. These bearings which run in liquid (ordinarily water) can suitably be in accordance with the present invention. In point of fact the bearing illustrated in Figure 1 is identical with the bearing 32 shown in the above identified application.

It will be clear that the invention is also applicable to end-thrust bearings of the tilting-pad type.

We claim:

1. A shaft and journal bearing therefor, comprising a shaft, a metal sleeve mounted fast on said shaft, said metal sleeve having undercut keyways of dove-tail section in its periphery, a sleeve of synthetic resin material mounted fast on said metal sleeve with the synthetic resin material engaging in and keying with said keyways to prevent substantial swelling of said synthetic resin sleeve, a plurality of tilting pads having bearing surfaces engaging the surface of said sleeve at intervals therearound, and housing means for said tilting pads, said housing means including adjusting means for shifting said tilting pads into conforming engagement with the surface of said synthetic sleeve while permitting the pads to tilt with the shaft relative to the housing.

2. A shaft and journal bearing therefor, comprising a shaft, a sleeve mounted fast on said shaft, said sleeve consisting of synthetic resin material, metal reinforcement means embedded in said synthetic resin sleeve to prevent substantial swelling of the latter, a plurality of tilting pads having bearing surfaces engaging the surface of said sleeve at intervals therearound, and housing means for said tilting pads, said housing means including adjusting means for shifting said tilting pads into conforming engagement with the surface of said synthetic sleeve while permitting the pads to tilt with the shaft relative to the housing.

3. A shaft and journal bearing therefor, comprising a shaft, a sleeve mounted fast on said shaft, said sleeve consisting of synthetic resin material, means including a helical metal coil embedded in said synthetic resin sleeve to prevent substantial swelling of the latter, a plurality of tilting pads having bearing surfaces engaging the surface of said sleeve at intervals therearound, and housing means for said tilting pads, said housing means including adjusting means for shifting said tilting pads into conforming engagement with the surface of said synthetic sleeve while permitting the pads to tilt with the shaft relative to the housing.

4. A shaft and journal bearing therefor, comprising a shaft, a sleeve mounted fast on said shaft, said sleeve consisting of synthetic resin material, means including a series of metal rings embedded in said synthetic resin sleeve to prevent substantial swelling of the latter, a plurality of tilting pads having bearing surfaces engaging the surface of said sleeve at intervals therearound, and housing means for said tilting pads, said housing means including adjusting means for shifting said tilting pads into conforming engagement with the surface of said synthetic sleeve while permitting the pads to tilt with the shaft relative to the housing.

5. A shaft and journal bearing therefor, comprising a shaft, a sleeve mounted fast on said shaft, said sleeve consisting of synthetic resin material, means including a series of conical metal rings embedded in said synthetic resin sleeve in overlapping relation to each other longitudinally to prevent substantial swelling of said synthetic resin sleeve, a plurality of tilting pads having bearing surfaces engaging the surface of said sleeve at intervals therearound, and housing means for said tilting pads, said housing means including adjusting means for shifting said tilting pads into conforming engagement with the surface of said synthetic sleeve while permitting the pads to tilt with the shaft relative to the housing.

6. A shaft and journal bearing therefor, comprising a shaft, a sleeve mounted fast on said shaft, said sleeve consisting of synthetic resin material, means including a substantial metal ring surrounding at least one end of said synthetic resin sleeve to prevent substantial swelling of said synthetic resin sleeve, a plurality of tilting pads having bearing surfaces engaging the surface of said sleeve at intervals therearound, and housing means for said tilting pads, said housing means including adjusting means for shifting said tilting pads into conforming engagement with the surface of said synthetic sleeve while permitting the pads to tilt with the shaft relative to the housing.

7. A shaft and journal bearing therefor, comprising a shaft, a metal sleeve mounted fast on said shaft, said metal sleeve having undercut keyways of dove-tail section in its periphery, a sleeve of synthetic resin material mounted fast on said metal sleeve with the synthetic resin material engaging in and keying with said keyways to prevent substantial swelling of said synthetic resin sleeve, a plurality of tilting pads having bearing surfaces engaging the surface of said sleeve at intervals therearound, and housing means for said tilting pads, said housing means including means for maintaining said tilting pads in conforming engagement with the surface of said synthetic sleeve while permitting the pads to tilt with the shaft relative to the housing.

8. A shaft and journal bearing therefor, comprising a shaft, a sleeve mounted fast on said shaft, said sleeve consisting of synthetic resin material, metal reinforcement means embedded in said synthetic resin sleeve to prevent substantial swelling of the latter, a plurality of tilting pads having bearing surfaces engaging the surface of said sleeve at intervals therearound, and housing means for said tilting pads, said housing means including means for maintaining said tilting pads in conforming engagement with the surface of said synthetic sleeve while permitting the pads to tilt with the shaft relative to the housing.

9. A shaft and journal bearing therefor, comprising a shaft, a sleeve mounted fast on said shaft, said sleeve consisting of synthetic resin material, means including a helical metal coil embedded in said synthetic resin sleeve to prevent substantial swelling of the latter, a plurality of tilting pads having bearing surfaces engaging the surface of said sleeve at intervals therearound, and housing means for said tilting pads, said housing means including means for maintaining said tilting pads in conforming engagement with the surface of said synthetic sleeve while permitting the pads to tilt with the shaft relative to the housing.

10. A shaft and journal bearing therefor, comprising a shaft, a sleeve mounted fast on said shaft, said sleeve consisting of synthetic resin material, means including a series of metal rings embedded in said synthetic resin sleeve to prevent substantial swelling of the latter, a plurality of tilting pads having bearing surfaces engaging the surface of said sleeve at intervals therearound, and housing means for said tilting pads, said housing means including means for maintaining said tilting pads in conforming engagement with the surface of said synthetic sleeve while permitting the pads to tilt with the shaft relative to the housing.

11. A shaft and journal bearing therefor, comprising a shaft, a sleeve mounted fast on said shaft, said sleeve consisting of synthetic resin material, means including a series of conical metal rings embedded in said synthetic resin sleeve in overlapping relation to each other longitudinally to prevent substantial swelling of said synthetic resin sleeve, a plurality of tilting pads having bearing surfaces engaging the surface of said sleeve at intervals therearound, and housing means for said tilting pads, said housing means including means for maintaining said tilting pads in conforming engagement with the surface of said synthetic sleeve while permitting the pads to tilt with the shaft relative to the housing.

12. A shaft and journal bearing therefor, comprising a shaft, a sleeve mounted fast on said shaft, said sleeve consisting of synthetic resin material, means including a substantial metal ring surrounding at least one end of said synthetic resin sleeve to prevent substantial swelling of said synthetic resin sleeve, a plurality of tilting pads having bearing surfaces engaging the surface of said sleeve at intervals therearound, and housing means for said tilting pads, said housing means including means for maintaining said tilting pads in conforming engagement with the surface of said synthetic sleeve while permitting the pads to tilt with the shaft relative to the housing.

References Cited in the file of this patent

UNITED STATES PATENTS

| Number | Name | Date |
|---|---|---|
| 423,337 | McManus | Mar. 11, 1890 |
| 453,961 | Brown | June 9, 1891 |
| 1,054,265 | Baekeland | Feb. 25, 1913 |
| 1,929,836 | Brown | Oct. 10, 1933 |
| 2,223,518 | Heuberger | Dec. 3, 1940 |
| 2,247,995 | Gilbert | July 1, 1941 |
| 2,324,863 | Merchant | July 20, 1943 |
| 2,389,253 | Gatke | Nov. 20, 1945 |
| 2,622,949 | Cotchett | Dec. 23, 1952 |

FOREIGN PATENTS

| Number | Country | Date |
|---|---|---|
| 455,590 | Great Britain | Oct. 23, 1936 |
| 358,225 | Italy | Apr. 9, 1938 |
| 562,230 | Great Britain | June 22, 1944 |